(12) United States Patent
Matsuoka et al.

(10) Patent No.: US 9,889,797 B2
(45) Date of Patent: Feb. 13, 2018

(54) DRIVING SUPPORT DEVICE

(71) Applicant: TOYOTA JIDOSHA KABUSHIKI KAISHA, Toyota-shi (JP)

(72) Inventors: Katsuhiro Matsuoka, Nagakute (JP); Kazuhiro Morimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/229,166

(22) Filed: Aug. 5, 2016

(65) Prior Publication Data

US 2017/0072853 A1    Mar. 16, 2017

(30) Foreign Application Priority Data

Sep. 15, 2015  (JP) .................................. 2015-182105

(51) Int. Cl.
| | |
|---|---|
| *B60Q 1/00* | (2006.01) |
| *B60Q 9/00* | (2006.01) |
| *G08G 1/16* | (2006.01) |
| *B60W 40/10* | (2012.01) |
| *G07C 5/00* | (2006.01) |
| *G06K 9/00* | (2006.01) |

(52) U.S. Cl.
CPC ............. *B60Q 9/008* (2013.01); *B60W 40/10* (2013.01); *G06K 9/00785* (2013.01); *G06K 9/00805* (2013.01); *G07C 5/00* (2013.01); *G08G 1/164* (2013.01); *G08G 1/166* (2013.01)

(58) Field of Classification Search
CPC ........................... G08G 1/164; B60W 2550/14
See application file for complete search history.

(56) References Cited

U.S. PATENT DOCUMENTS

| | | | |
|---|---|---|---|
| 2004/0193347 A1* | 9/2004 | Harumoto ........... | B60R 21/0132 701/45 |
| 2005/0085954 A1* | 4/2005 | Isaji ..................... | B60K 28/066 701/1 |
| 2007/0257783 A1* | 11/2007 | Matsumoto ............ | B60K 6/445 340/425.5 |

FOREIGN PATENT DOCUMENTS

| | | |
|---|---|---|
| JP | 2009-31968 | 2/2009 |
| JP | 2013-105201 A | 5/2013 |

* cited by examiner

*Primary Examiner* — Fabricio R Murillo Garcia
(74) *Attorney, Agent, or Firm* — Oblon, McClelland, Maier & Neustadt, L.L.P.

(57) ABSTRACT

An intersection information acquisition unit acquires detection information by an object detection sensor including at least one of a vehicle detection sensor and a human detection sensor. A support processor performs driving support processing for outputting an alarm when the support processor determines that an own vehicle intends to cross the opposite lane and determines based on the acquired detection information that an object exists or the object is approaching in a direction in which the own vehicle travels to cross the opposite lane at the intersection. The support processor performs the driving support processing when the intersection information acquisition unit acquires detection information by the vehicle detection sensor. On the other hand, the support processor does not perform the driving support processing when the intersection information acquisition unit acquires detection information by the human detection sensor and does not acquire detection information by the vehicle detection sensor.

3 Claims, 12 Drawing Sheets

DRIVING SUPPORT DEVICE

BACKGROUND OF THE INVENTION

1. Field of the Invention

The present invention relates to a technique for supporting driving at an intersection, and especially relates to a technique which attracts drivers' attention by an alarm when a vehicle intends to proceed into an intersection and cross the opposite lane.

2. Description of the Related Art

Patent document 1 discloses a device for supporting safe driving at an intersection. When a vehicle is waiting at an intersection to turn right, a roadside machine sends, to the device, a type and a form of the intersection, existence of an oncoming vehicle, a type of a vehicle on an opposite lane, a vehicle speed, an inter-vehicle distance to a preceding vehicle, an image of the intersection, existence of a pedestrian, and a lane condition after the vehicle turns right (information on a driving state of an oncoming vehicle, and information reflecting a traffic condition), and the device determines right turn timing based on the data and outputs the timing to a driver.

[patent document 1] JP2009-31968A

In a driving support control in the case of turning right on a road kept left, drivers' attention is attracted by an alarm such as screen display and sound output by using detection information by an object detection sensor in a roadside machine to avoid a risk of a collision with an object such as an oncoming vehicle and a pedestrian. If a vehicle detection sensor for detecting an oncoming vehicle and a human detection sensor for detecting a pedestrian on a pedestrian crossing on the right side are disposed as an object detection sensor, an oncoming vehicle and a pedestrian at risk for a collision can be detected as a detection target when a vehicle turns right. However, if only the vehicle detection sensor is disposed, a pedestrian cannot be detected. Further, if only the human detection sensor is disposed, an oncoming vehicle cannot be detected. As described above, a detection target of a roadside machine is varied according to a type of the disposed object detection sensor.

When a vehicle turns right at an intersection on a road kept left, the vehicle crosses an opposite lane and passes through a pedestrian crossing on the right side. Therefore, when the vehicle is waiting at the intersection to turn right, first a driver pays attention to an oncoming vehicle on the opposite lane, and there is no oncoming vehicle, the driver pays attention to a pedestrian crossing on the right side. In this manner, a driver confirms safety by confirming that there is no oncoming vehicle and then confirming that a pedestrian is not working on a pedestrian crossing on the right side.

If an alarm is not output when a vehicle is waiting at an intersection to turn right, a driver recognizes that the vehicle can safely turn right, and then the driver visually confirms safety. However, at an intersection where an alarm has been output in the past when a vehicle has been waiting to turn right, if an alarm is not output this time when the vehicle is waiting to turn right, a driver easily recognizes that the vehicle can turn right and may not sufficiently confirm safety.

If a vehicle detection sensor and a human detection sensor are disposed at an intersection, a driver can detect an oncoming vehicle and a pedestrian to watch out for when turning right at the intersection. Therefore, a driving support control can be appropriately performed when a vehicle turns right. However, if only the vehicle detection sensor is installed, there is a problem that a pedestrian cannot be detected. Further, if only the human detection sensor is installed, there is a problem that an oncoming vehicle cannot be detected. Therefore, the inventor of the present invention considers a method for the driving support control in each case.

SUMMARY OF THE INVENTION

The present invention is in view of the above state, and an object of the present invention is to provide a technique to determine executability of a driving support according to a detection target by a roadside machine disposed at or around an intersection.

To solve the above issue, a driving support device of a mode according to the present invention includes an acquirer and a support processor. The acquirer acquires detection information sent from a roadside machine disposed at or around an intersection and detected by an object detection sensor including at least one of a vehicle detection sensor and a human detection sensor. The support processor performs driving support processing for outputting an alarm when the support processor determines that an own vehicle intends to proceed into an intersection and cross the opposite lane and determines based on the acquired detection information that an object exists or is moving in a direction in which the own vehicle travels to cross the opposite lane at the intersection. When the acquirer acquires detection information by a vehicle detection sensor for detecting a vehicle traveling on the opposite lane, the support processor performs driving support processing. When the acquirer acquires detection information by a human detection sensor for detecting a person ahead of the opposite lane in a direction in which an own vehicle travels to cross the opposite lane, and the acquirer does not acquire detection information by the vehicle detection sensor, the support processor does not perform the driving support processing.

According to the mode, when the acquirer does not acquire detection information by the vehicle detection sensor, alarm output by the support processor is prohibited. Consequently, for example, an alarm is not output at an intersection in which only a human detection sensor is installed. Therefore, a driver does not depend on the alarm and can recognize the necessity of sufficient safety confirmation.

When the acquirer acquires detection information by the vehicle detection sensor, the support processor may perform driving support processing regardless of whether the acquirer acquires detection information by the human detection sensor. The support processor may change a mode of alarm to be output depending on whether the acquirer acquires detection information by the human detection sensor or not. A detection target in an intersection may be indicated to a driver, for example, by including information indicating the detection target on an alarm image. Further, the driving support device may further include a support executability determiner for determining the executability of driving support processing by the support processor according to a type of detection information acquired by the acquirer.

DETAILED DESCRIPTION OF THE INVENTION

The invention will now be described by reference to the preferred embodiments. This does not intend to limit the scope of the present invention, but to exemplify the invention.

Figure 1:
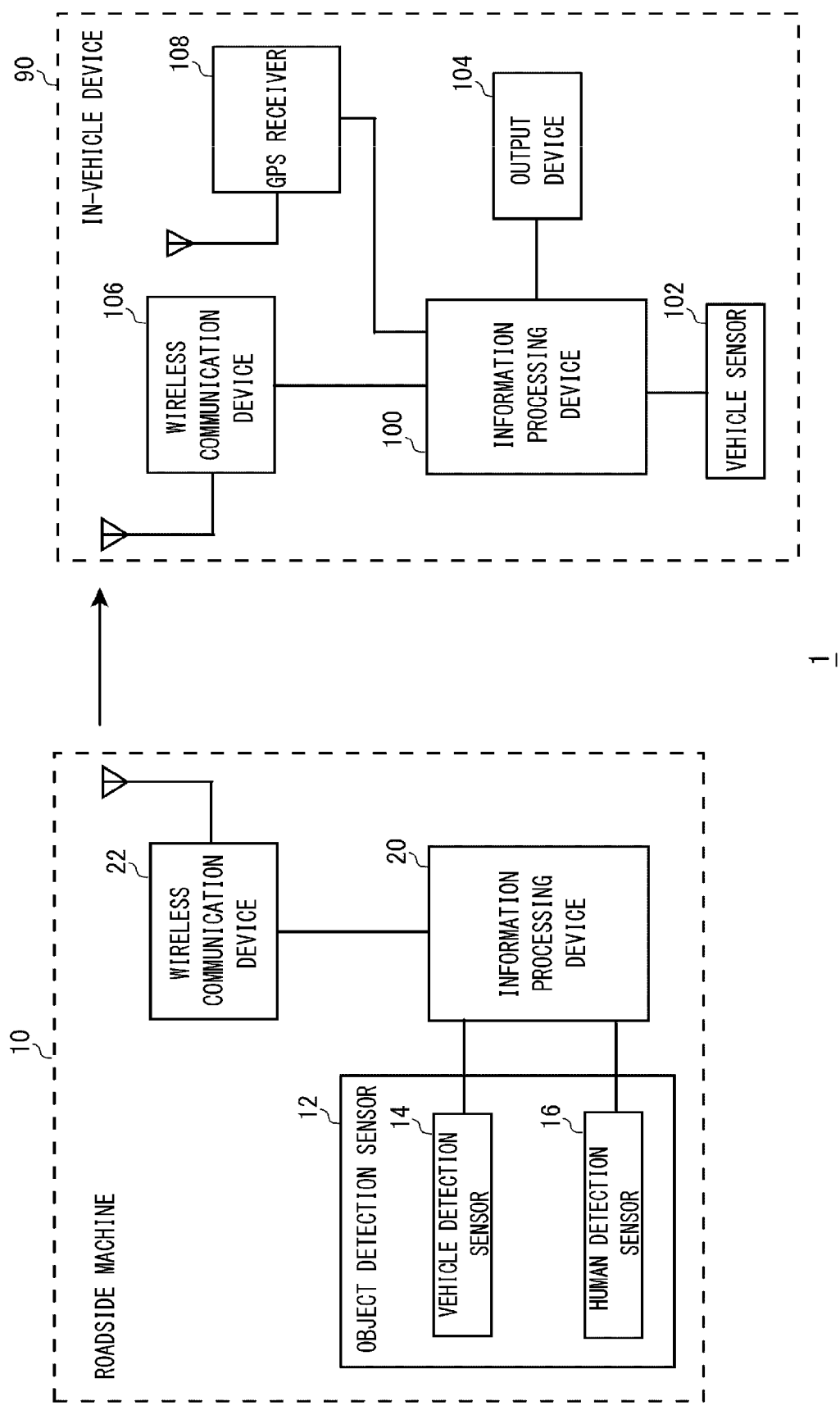
FIG. 1 is a diagram illustrating a road-to-vehicle communication system according to an embodiment.

FIG. 1 illustrates a configuration of a road-to-vehicle communication system 1 according to an embodiment. The road-to-vehicle communication system 1 includes a roadside machine 10 disposed at or around an intersection and an in-vehicle device 90 mounted in a vehicle. As described later, the roadside machine 10 includes multiple elements. In the present description, "the roadside machine 10 is disposed at or around an intersection" means including a case where all elements of the roadside machine 10 are disposed at the intersection, a case where all elements of the roadside machine 10 are disposed around the intersection, and also a case where a part of the elements of the roadside machine 10 are disposed at the intersection, and the other elements are disposed around the intersection.

When a vehicle intends to cross the opposite lane at an intersection, the road-to-vehicle communication system 1 realizes a driving support system by which a driver can pay attention to other vehicles running on the opposite lane and pedestrians walking on a pedestrian crossing ahead of an intersection. Crossing the opposite lane at an intersection is turning right at an intersection in countries such as Japan and England where vehicles drive on the left side and turning left at an intersection in countries such as USA, German, and China where vehicles drive on the right side. In the embodiment, the driving support system will be described which supports to pay attention to oncoming vehicles and pedestrians when a vehicle turns right at an intersection based on an assumption that vehicles drive on the left.

The roadside machine 10 includes an object detection sensor 12, an information processing device 20, and a wireless communication device 22. The object detection sensor 12 includes at least one of a vehicle detection sensor 14 and a human detection sensor 16. The vehicle detection sensor 14 detects a traveling vehicle. The human detection sensor 16 detects a pedestrian and a person riding on a bicycle. Detection information by the vehicle detection sensor 14 and detection information by the human detection sensor 16 are provided to the information processing device 20 at a predetermined cycle.

The vehicle detection sensor 14 detects a state of a vehicle traveling toward the center of an intersection. The center of the intersection is positioned on a line vertically dividing an intersection area into two with respect to a traveling direction (refer to FIG. 3). Detection information by the vehicle detection sensor 14 may include existence of a vehicle, a position of the vehicle, and speed of the vehicle. The vehicle detection sensor 14 may include a radar sensor and an image sensor.

The human detection sensor 16 detects a pedestrian walking on a pedestrian crossing and a person riding on a bicycle at an intersection. Detection information by the human detection sensor 16 may include existence of a person, a position of the person, and a speed of the person. The human detection sensor 16 may include a radar sensor and an image sensor.

The information processing device 20 is a computer. Each function of the information processing device 20 to be described later is configured by a circuit block, a memory, and other LSI in the manner of hardware and is realized by such as a program loaded in the memory in the manner of software. Therefore, a person skilled in the art understands that each function of the information processing device 20 can be realized in various forms by hardware, by software, or by combination of hardware and software, but not limited to any of these.

The information processing device 20 obtains detection information by the object detection sensor 12 and generates object detection information to be provided to the in-vehicle device 90. As described later, at some intersections, the roadside machine 10 may not include both of the vehicle detection sensor 14 and the human detection sensor 16, the roadside machine 10 may include the vehicle detection sensor 14 and not include the human detection sensor 16, or the roadside machine 10 may include the human detection sensor 16 and not include the vehicle detection sensor 14.

The information processing device 20 generates object detection information including vehicle detection information and human detection information if the information processing device 20 obtains detection information by the vehicle detection sensor 14 and the human detection sensor 16. Further, the information processing device 20 generates object detection information only including vehicle detection information if the information processing device 20 obtains only detection information by the vehicle detection sensor 14. Further, the information processing device 20 generates object detection information including only human detection information if the information processing device 20 obtains only detection information by the human detection sensor 16. In this manner, the object detection information generated by the information processing device 20 depends on a type of the object detection sensor 12 disposed at an intersection.

Further, the information processing device 20 stores road linear information (map information) at or around an intersection where the information processing device 20 is disposed. The road linear information includes information for realizing a driving support service when a vehicle turns right and includes, for example, a starting position which is the basis of service start and an end position which is the basis of service stop.

The wireless communication device 22 sends object detection information and road linear information to the in-vehicle device 90 at a predetermined cycle as intersection information. For example, the wireless communication device 22 sends object detection information and road linear information at a cycle of 0.1 seconds at or around an intersection by broadcasting. The intersection information may include control information including traffic control information and speed control information and signal information indicating a signal cycle and a current lamp color of a traffic signal, in addition to the object detection information and the road linear information.

The in-vehicle device 90 forms a driving support device by including an information processing device 100, a vehicle sensor 102, an output device 104, a wireless communication device 106, and a global positioning system (GPS) receiver 108.

The information processing device 100 is a computer. Each function of the information processing device 100 to be described later is configured by a circuit block, a memory, and other LSI in the manner of hardware and is realized by such as a program loaded in the memory in the manner of software. Therefore, a person skilled in the art understands that each function of the information processing device 100 can be realized in various forms by hardware, by software, or by combination of hardware and software, but not limited to any of these.

The vehicle sensor 102 includes, for example, a wheel speed sensor, a brake sensor, a direction indicator sensor for detecting an operation state of a direction indicator lever, a steering angle sensor, an acceleration sensor for detecting an operation state of an accelerator, and provides each detection information to the information processing device 100. The brake sensor is a sensor for detecting brake operation by a driver, may be a means for detecting on/off of a stop lamp switch, and may be a means for detecting, for example, a master cylinder pressure and a wheel cylinder pressure. The direction indicator sensor detects an operation position of the direction indicator lever, generates detection information indicating that a right direction indicator is turned on when the right direction indicator is turned on according to the embodiment, and generates detection information indicating that the right direction indicator is turned off when the right direction indicator is turned off. According to the embodiment, the detection information indicating that a right direction indicator is turned off includes detection information indicating that a direction indicator lever is operated and moved from an on-position of the right direction indicator to another position.

The output device 104 is a device for outputting an alarm to a driver and includes a display device for outputting a alarm screen and a sound output device for outputting an alarm sound. The GPS receiver 108 calculates an own vehicle position based on a signal from a satellite. The GPS receiver 108 calculates a latitude, a longitude, and a direction of the own vehicle. The wireless communication device 106 receives intersection information sent by broadcasting from the wireless communication device 22 of the roadside machine 10.

Figure 2:
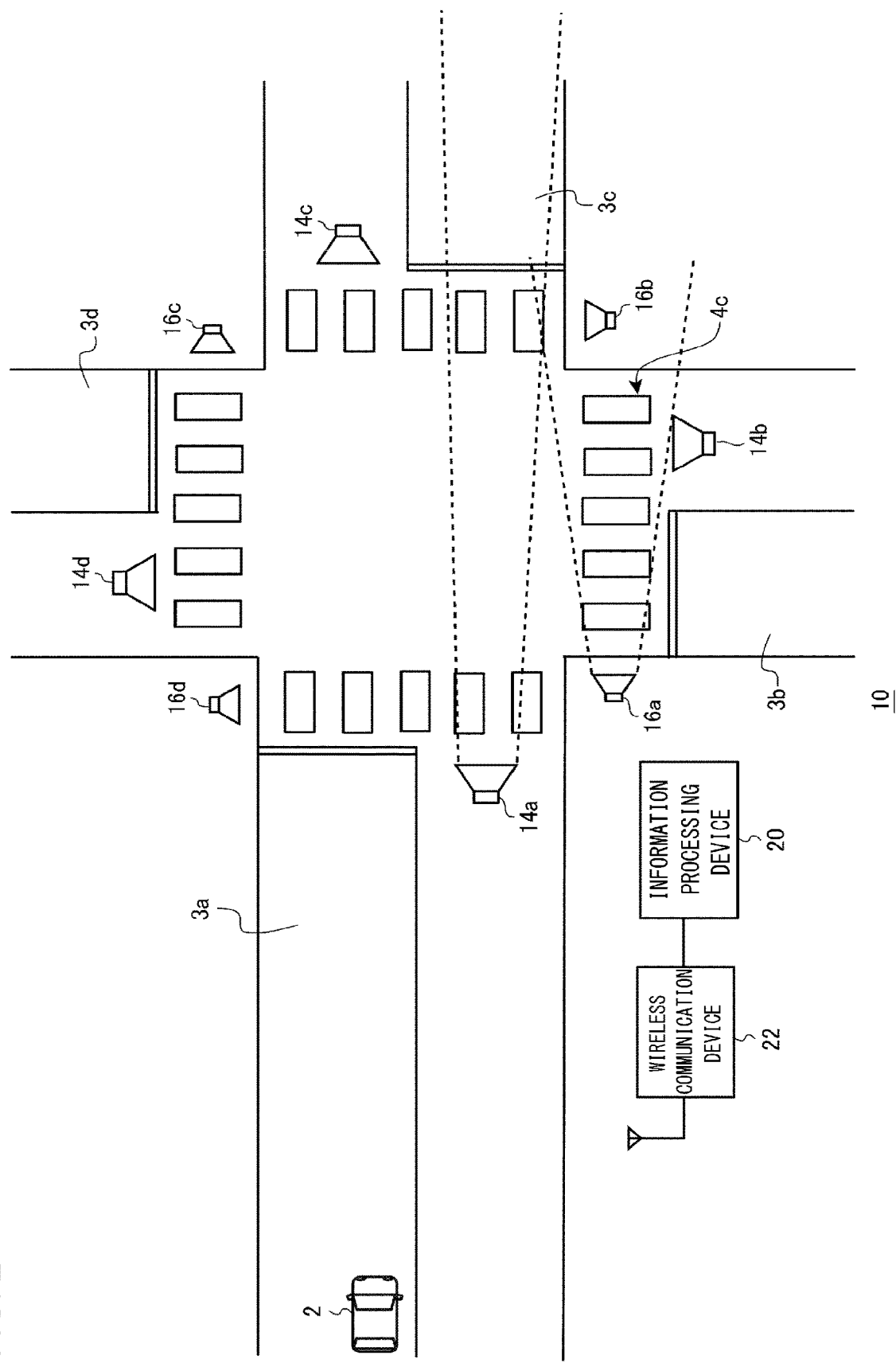
FIG. 2 is a view illustrating an example of a configuration of roadside machines at an intersection.

FIG. 2 illustrates an example of a configuration of the roadside machine 10 at an intersection where an own vehicle approaches. The intersection is a four-way junction with roads extending in four directions. The vehicle detection sensor 14 and the human detection sensor 16 are provided to each of the four routes extending to the intersection (hereinafter also called "a path").

When an own vehicle 2 moving on a path 3a proceeds into an intersection and turns right, a driver of the own vehicle 2 needs to pay attention to an oncoming vehicle proceeding into the intersection from a path 3c and a pedestrian walking on a pedestrian crossing 4c on a right side. Therefore, a vehicle detection sensor 14a and a human detection sensor 16a are provided at the intersection. The vehicle detection sensor 14a detects a vehicle traveling toward the intersection on the path 3c, which is the opposite lane, to support when the vehicle proceeding into the intersection from the path 3a turns right. The human detection sensor 16a detects a person on the pedestrian crossing 4c ahead of the opposite lane in a direction in which the vehicle turning right travels to cross the opposite lane. Similarly, a vehicle detection sensor 14b and a human detection sensor 16b are provided to support when a vehicle proceeding into an intersection from a path 3b turns right. A vehicle detection sensor 14c and a human detection sensor 16c are provided to support when a vehicle proceeding into the intersection from the path 3c turns right. A vehicle detection sensor 14d and a human detection sensor 16d are provided to support when a vehicle proceeding into the intersection from a path 3d turns right.

Each of the vehicle detection sensors 14a to 14d and each of the human detection sensors 16a to 16d are wire-connected by a cable (not illustrated) to the information processing device 20 and provide detection information to the information processing device 20. Each of the vehicle detection sensors 14a to 14d and the human detection sensors 16a to 16d may be wireless-connected to the information processing device 20 via the wireless communication device 22 and provide the detection information to the information processing device 20. An output cycle of the detection information by each sensor is set to 0.1 seconds, for example.

Figure 3:
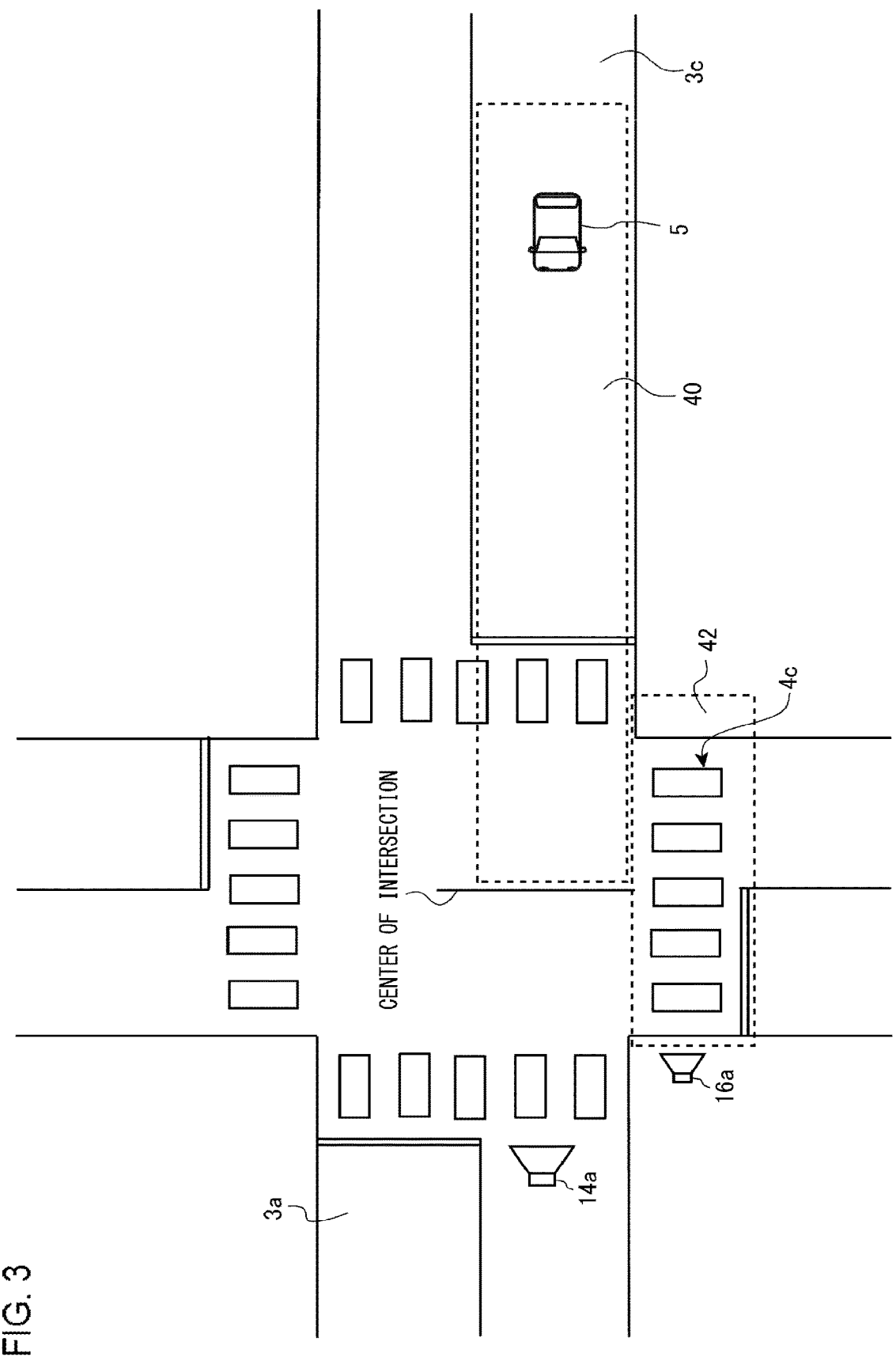
FIG. 3 is a view illustrating an example of a detection area of a vehicle detection sensor and a human detection sensor.

FIG. 3 illustrates an example of a detection area of the vehicle detection sensor 14a and the human detection sensor 16a. A vehicle detection area 40 in which the vehicle detection sensor 14a detects a vehicle is within a range which is from a detection area end on the path 3c (the center of an intersection) to a predetermined distance and, for example, set to a range of approximately 140 m from the detection area end. A detection target is a vehicle moving on the path 3c toward an intersection. When viewing from a moving vehicle on the path 3a, the path 3c is the opposite lane, and also a vehicle moving on the path 3c is an oncoming vehicle. This example indicates that an oncoming vehicle 5 is moving toward the intersection.

The vehicle detection sensor 14a detects a speed of a vehicle in the vehicle detection area 40 and a distance to a detection area end. If there are multiple vehicles in the vehicle detection area 40, the vehicle detection sensor 14a detects a speed and a distance of each vehicle and outputs the vehicle speed and the distance to the detection area end as detection information for each vehicle to the information processing device 20.

A human detection area 42 in which the human detection sensor 16a detects a person is set to the whole of the pedestrian crossing 4c and a range around the pedestrian crossing 4c. A detection target includes a pedestrian and a person riding on a bicycle on and around the pedestrian crossing 4c. When the human detection sensor 16a detects a person in the human detection area 42, the human detection sensor 16a outputs detection information indicating that a person exists to the information processing device 20. The human detection sensor 16a may detect a moving direction and a moving speed of a person and output the moving direction and the moving speed as detection information for each person to the information processing device 20.

Figure 4:
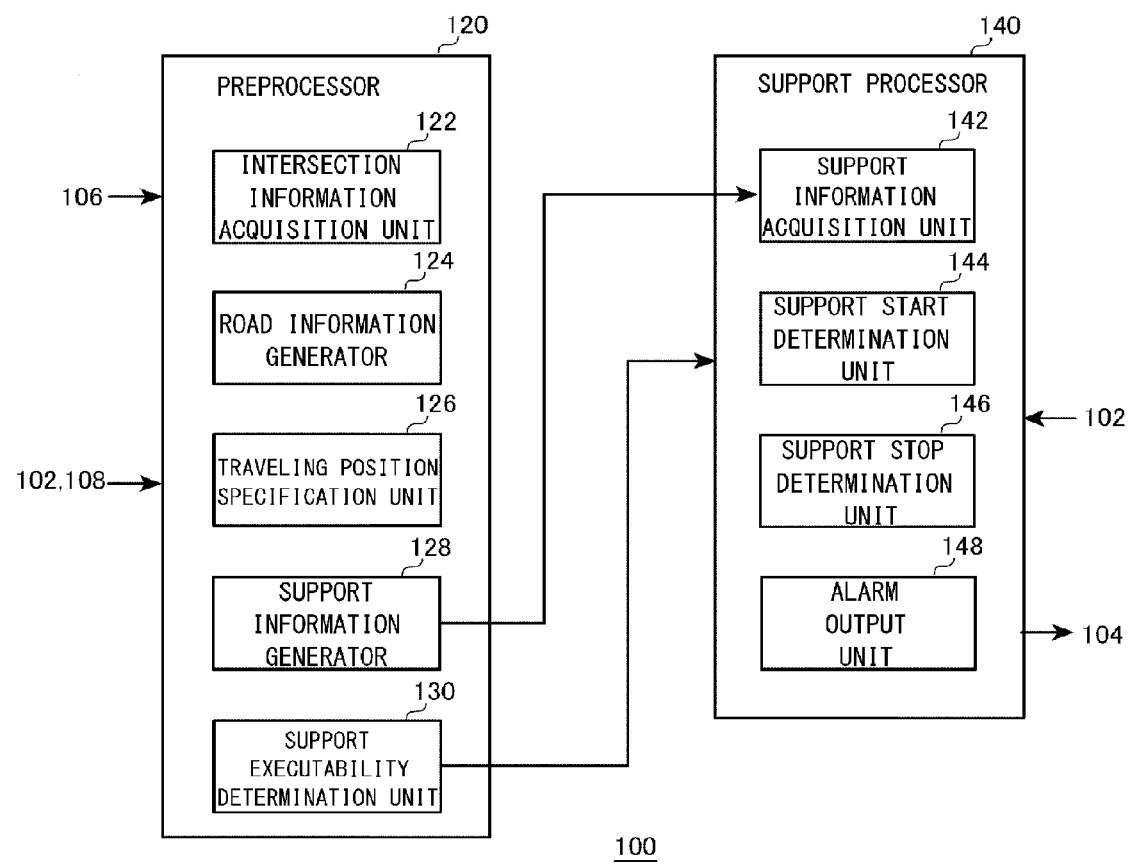
FIG. 4 is a diagram illustrating an example of a configuration of an information processing device.

FIG. 4 illustrates an example of a configuration of the information processing device 100 in the in-vehicle device 90. The information processing device 100 includes a preprocessor 120 and a support processor 140. The preprocessor 120 processes intersection information sent from the roadside machine 10. The support processor 140 performs driving support processing based on support information, which is processed by the preprocessor 120. The preprocessor 120 includes an intersection information acquisition unit 122, a road information generator 124, a traveling position specification unit 126, an support information generator 128, and a support executability determination unit 130.

When the wireless communication device 106 receives intersection information sent from the wireless communication device 22 of the roadside machine 10, the intersection information acquisition unit 122 acquires intersection information from the wireless communication device 106. The road information generator 124 generates road information at and around an intersection based on road linear information (map information) included in the intersection information.

Figure 5:
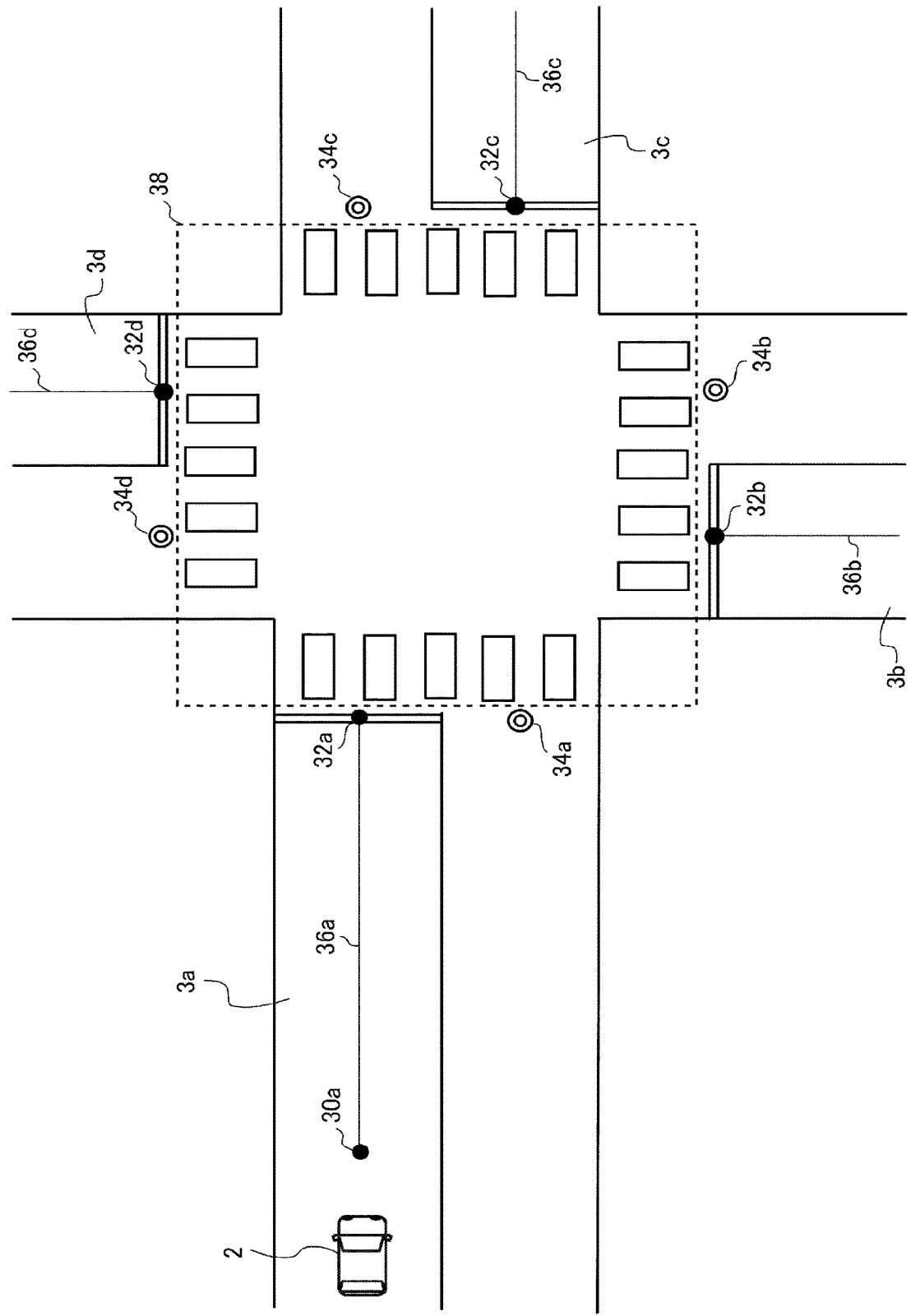
FIG. 5 is a view illustrating an example of road information generated by a road information generator.

FIG. 5 illustrates an example of the road information generated by the road information generator 124. The load linear information includes information on an intersection and a form of a road connecting to the intersection or node information used in driving support processing. The road form information and the node information are defined by a latitude and a longitude. A part of these information determines service path information necessary when the traveling position specification unit 126 determines a path on which a vehicle is traveling. The service path information is information on the position from a starting point to a stop line on a path toward an intersection and information to determine a path on which an own vehicle is traveling before the driving support processing is performed.

A service path is specified by a starting point node and a stop line node. In the path 3a, a service path 36a is specified by a starting point node 30a and a stop line node 32a. Although starting point nodes on other paths 3b to 3d are not illustrated, as with the service path 36a, the service paths 36b to 36d are specified by each starting point node and the stop line nodes 32b to 32d.

Ending point nodes 34a to 34d indicate ending points on an intersection. For example, the three ending point nodes 34b to 34d are possible ending points of the intersection with respect to a vehicle moving on the service path 36a. Further, three ending point nodes 34a, 34c, and 34d are possible ending points of the intersection with respect to a vehicle moving on the service path 36b. In the embodiment, a region on an inner side of the ending point nodes 34a to 34d is called "an intersection region 38" for convenience.

The node information is used for specifying a position of the own vehicle 2 necessary for driving support processing. Specifically, the node information is used for determining whether the own vehicle 2 is positioned in front of the intersection region 38, whether the own vehicle 2 proceeds into the intersection region 38, or whether the own vehicle 2 passes by the intersection region 38. The road linear information include distance information between a starting point node and a stop line node, distance information between the starting point node and the center of an intersection (or a stop line for right-turning), and distance information between the starting point node and an ending point node. These distance information is also used for specifying a position of the own vehicle 2 necessary for the driving support processing. Distance information between nodes means a road distance traveled by a vehicle and does not mean a straight distance even though the distance may be equal to a length connected with a straight line between nodes.

In the example illustrated in FIG. 5, only a starting point node and a stop line node are indicated on a path. However, a node may be further included between the starting point node and the stop line node. Especially, if there is a branch route on a service path, a branch node may be set at a branch point position.

With reference to FIG. 4 again, the traveling position specification unit 126 determines a path on which the own vehicle 2 travels based on service path information generated by the road information generator 124 and own vehicle position detection information (a latitude, a longitude, and a direction) by the GPS receiver 108. The traveling position specification unit 126 specifies a service path on which a vehicle is traveling by selecting the closest path from service paths 36a to 36d indicated in FIG. 5 based on the latitude, the longitude, and the direction calculated by the GPS receiver 108. For example, the traveling position specification unit 126 calculates a distance between an own vehicle position detected by the GPS receiver 108 and each of the service paths 36a to 36d, and the shortest distance service path may be determined as a service path on which a vehicle is traveling. Herein, it is specified that the own vehicle 2 is traveling on the service path 36a.

The traveling position specification unit 126 specifies the service path 36a as a service path on which a vehicle is traveling and calculates a distance L1 between a position on the service path 36a corresponding to an own vehicle position and the starting point node 30a. Then, the distance L1 is used for calculating an own vehicle traveling distance L2 from the starting point node 30a.

The own vehicle traveling distance L2 from the starting point node is calculated as below.

$$(\text{own vehicle traveling distance } L2) = \text{distance } L1 + \Sigma(\text{vehicle speed} \times \text{time})$$

As described above, the traveling position specification unit 126 calculates the own vehicle traveling distance L2 from the distance L1 and a distance added up by using vehicle speed information by a wheel speed sensor. This calculation processing is performed in a cycle of 0.1 seconds, and the traveling position specification unit 126 provides calculated own vehicle traveling distance information to the support information generator 128. The own vehicle traveling distance L2 from a starting point node becomes necessary information for specifying a position of the own vehicle 2 by comparing distance information between nodes included in the road linear information.

When the traveling position specification unit 126 specifies the service path 36a on which the own vehicle 2 is traveling, the support information generator 128 generates support information to be provided to the support processor 140 based on intersection information sent from the roadside machine 10 and the own vehicle traveling distance L2 calculated by the traveling position specification unit 126. The support information generator 128 may have a function to calculate an own vehicle traveling distance and calculate a traveling distance from a starting point node.

The support information generator 128 specifies the object detection sensor 12 to detect an object targeted for right turn support based on the service path 36a specified by the traveling position specification unit 126. Intersection information sent from the roadside machine 10 includes corresponding information with the service path and the object detection sensor 12. As illustrated in FIG. 2, the vehicle detection sensor 14a and the human detection sensor 16a are provided for supporting when a vehicle traveling on the service path 36a turns right. Therefore, the intersection information includes corresponding information indicating that the vehicle detection sensor 14a and the human detection sensor 16a are provided on the service path 36a.

Similarly, the intersection information includes corresponding information indicating that the vehicle detection sensor 14b and the human detection sensor 16b are provided on the service path 36b, that the vehicle detection sensor 14c and the human detection sensor 16c are provided on the service path 36c, and that the vehicle detection sensor 14d and the human detection sensor 16d are provided on the service path 36d.

The intersection information sent from the roadside machine 10 includes detection information by all of the vehicle detection sensors 14a to 14d and the human detection sensors 16a to 16d. The support information generator 128 extracts detection information of the vehicle detection sensor 14a and the human detection sensor 16a corresponding to the service path 36a with reference to the corresponding information. Further, the support information generator 128 specifies the starting point node 30a and the stop line node 32a forming the service path 36a and specifies the ending point node 34b which becomes an ending point when a vehicle turns right at an intersection. Accordingly, the support information generator 128 extracts, from the intersection information, distance information between the starting point node 30a and the stop line node 32a and distance information between the starting point node 30a and the ending point node 34b.

The intersection information is sent at a cycle of 0.1 seconds from the roadside machine 10 by broadcasting, and the support information generator 128 extracts detection information by the vehicle detection sensor 14a and the human detection sensor 16a at every 0.1 seconds. The support information generator 128 provides, to the support processor 140 at a cycle of 0.1 seconds as support information, own vehicle travel distance information, distance information between the starting point node 30a and the stop line node 32a, distance information between the starting point node 30a and the ending point node 34b, detection information by the vehicle detection sensor 14a, and detection information by the human detection sensor 16a. In the embodiment, it has been described that, with reference to the corresponding information, the support information generator 128 generates support information by appropriately extracting information necessary for the driving support processing. However, all of the detection information, the distance information and the corresponding information included in the intersection information may be included in the support information. In this case, processing to extract the necessary information is performed by the support processor 140.

The support executability determination unit 130 determines whether driving support processing can be performed by the support processor 140. The support executability determination unit 130 determines the executability of the driving support processing by the support processor 140 according to a type of detection information included in the intersection information obtained by the intersection information acquisition unit 122. Herein, a type of the detection information corresponds to a type of a detection sensor which obtains detection information, and attribute information such as a type of a detection sensor and an identification number is added to the detection information. Although a detailed reason will be described later, the support executability determination unit 130 determines that driving support processing is executable if intersection information includes detection information by the vehicle detection sensor 14 and determines that the driving support processing in not executable if the intersection information does not include the detection information by the vehicle detection sensor 14.

The support executability determination unit 130 determines a type of detection information included in intersection information when the intersection information acquisition unit 122 first acquires intersection information. Therefore, executability of the driving support processing by the support processor 140 can be immediately determined. Therefore, if the support executability determination unit 130 determines that the driving support processing is not executable, the support executability determination unit 130 may control such that each function of the support processor 140 is not started. As described above, each of the road information generator 124, the traveling position specification unit 126, and the support information generator 128 in the preprocessor 120 performs pre-processing necessary for driving support processing in the support processor 140. However, if the driving support processing is not performed in the support processor 140, each processing in the road information generator 124, the traveling position specification unit 126, and the support information generator 128 is not needed. Therefore, when the support executability determination unit 130 determines that the driving support processing is not executable, the support executability determination unit 130 may control such that each function of the road information generator 124, the traveling position specification unit 126, and the support information generator 128 are not started.

As illustrated in FIG. 2, the roadside machine 10 includes the vehicle detection sensor 14 and the human detection sensor 16. When the intersection information sent from the wireless communication device 22 includes detection information by the vehicle detection sensor 14 and the human detection sensor 16, the support executability determination unit 130 determines that driving support processing by the support processor 140 is executable and controls such that each function of the support processor 140 is started.

With reference to FIG. 4 again, the support processor 140 includes an support information acquisition unit 142, a support start determination unit 144, a support stop determination unit 146, and an alarm output unit 148. The support information acquisition unit 142 acquires support information generated by the support information generator 128. The support information generator 128 updates support information at a cycle of 0.1 seconds, and the support information acquisition unit 142 acquires support information at a cycle of 0.1 seconds. The support information acquisition unit 142 provides the acquired support information to the support start determination unit 144 and the support stop determination unit 146.

The support start determination unit 144 monitors establishment of conditions to start right-turn support.

The support start conditions will be described below.

(a1) An own vehicle traveling position is in a target area for right-turn support.

(a2) A driver intends to turn right.

(a3) A vehicle starts from a stop state.

(a4) An oncoming vehicle is approaching in the right turn direction at an intersection, or a person exists in the direction.

Figure 6:
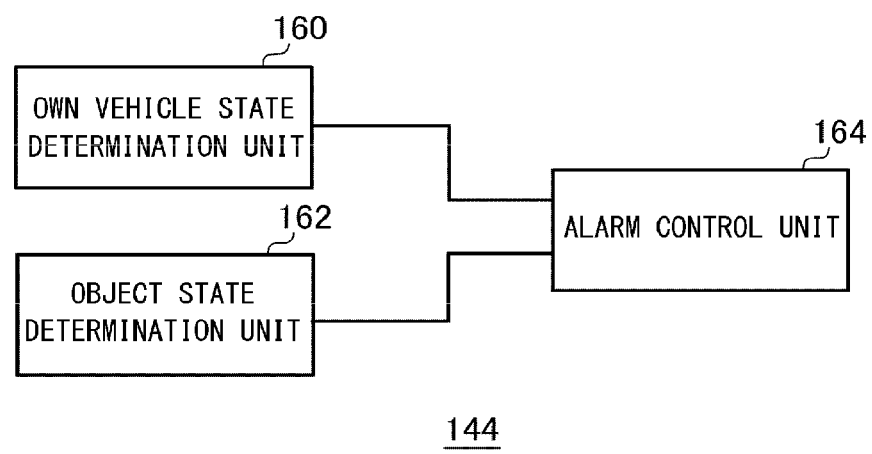
FIG. 6 is a diagram illustrating a configuration of a support start determination unit.

FIG. 6 illustrates a configuration of the support start determination unit 144. The support start determination unit 144 includes an own vehicle state determination unit 160, an object state determination unit 162, and an alarm controller 164. The own vehicle state determination unit 160 determines whether the own vehicle 2 intends to cross the opposite lane at an intersection. In the embodiment, the own vehicle state determination unit 160 determines whether the own vehicle 2 intends to turn right at an intersection. The object state determination unit 162 determines based on the acquired detection information whether there is an object in a direction in which the own vehicle 2 travels to cross the opposite lane at an intersection and whether the object is approaching. When the own vehicle state determination unit 160 determines that the own vehicle 2 intends to cross the opposite lane at an intersection, and the object state determination unit 162 determines that an object exists or is moving in a direction in which the own vehicle 2 travels to cross the opposite lane at the intersection, the alarm controller 164 generates an alarm output instruction and provides the instruction to an alarm output unit 148. The alarm output unit 148 outputs an alarm after receiving the alarm output instruction.

Figure 7:
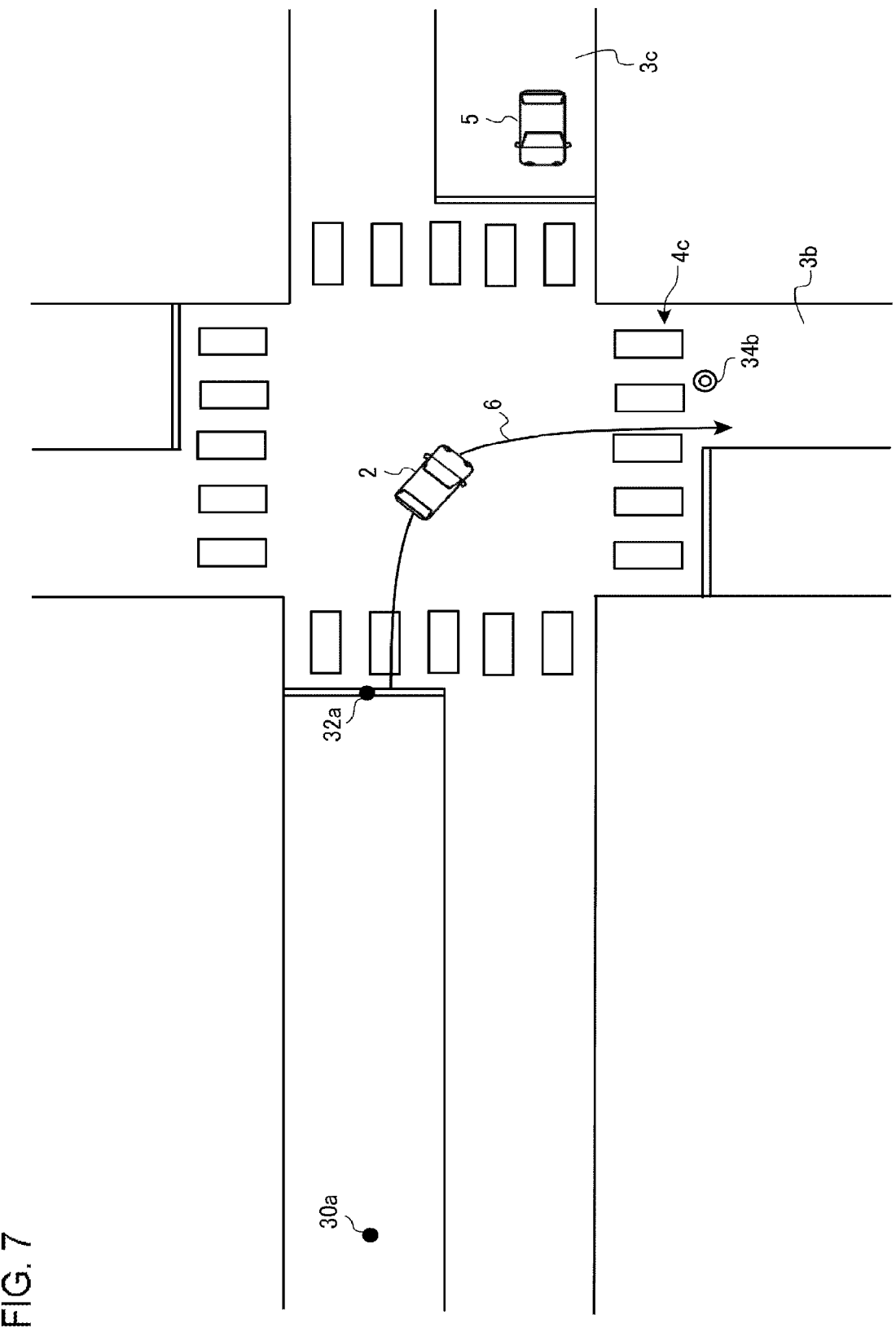
FIG. 7 is a view for describing support start determination processing.

FIG. 7 is a view for describing support start determination processing by the support start determination unit 144. In FIG. 7, the own vehicle 2 proceeds into an intersection region and stops once to turn right from the position. A traveling locus 6 is a locus when the own vehicle 2 proceeds into the intersection region, turns right at the intersection, and passes by the intersection region, and indicates a direction in which the own vehicle 2 passes by the intersection region, specifically, a direction in which the own vehicle 2 travels to cross the opposite lane at the intersection. When the own vehicle 2 turns right in an intersection region, the own vehicle 2 crosses the path 3*c* which is the opposite lane and the pedestrian crossing 4*c* ahead of the opposite lane.

Determination processing of each condition will be described later. The own vehicle state determination unit 160 determines whether the conditions (a1) to (a3) are established, and the object state determination unit 162 determines whether the condition (a4) is established. The own vehicle state determination unit 160 and the object state determination unit 162 notify the alarm controller 164 of a determination result of each condition.

Whether the condition (a1) is established is determined based on distance information included in support information. A target area for right-turn support is in an intersection region and determined by the following formula.

(a distance between a starting point node and a stop line node)≤(the distance $L2$ between a starting point node and an own vehicle)≤(a distance between a starting point node and an exit path ending point node)

With reference to FIG. 7, when the own vehicle 2 turns right at an intersection, the own vehicle 2 passes through the stop line node 32*a* and proceeds into the path 3*b*. Therefore, an ending point node on the exit path becomes the ending point node 34*b*. Therefore, the above determination formula is for determining that an own vehicle traveling position is positioned between the stop line node 32*a* and the ending point node 34*b*. When the determination formula is established, the own vehicle state determination unit 160 detects that the own vehicle traveling position is in a target area for right-turn support and determines that the condition (a1) is established.

Whether the condition (a2) is established is determined based on detection information by a direction indicator sensor of the vehicle sensor 102. When a driver operates a direction indicator lever and flickers a right direction indicator, a direction indicator sensor provides detection information indicating that the right direction indicator is turned on to the support processor 140. The own vehicle state determination unit 160 determines that the condition (a2) is established when receiving detection information that the right direction indicator is turned on.

Establishment of the conditions (a1) and (a2) corresponds that the own vehicle 2 intends to proceed into an intersection and cross the opposite lane. The own vehicle state determination unit 160 determines by the establishment of the conditions (a1) and (a2) that the own vehicle 2 intends to proceed into an intersection and cross the opposite lane at an intersection.

Whether the condition (a3) is established is determined by whether a stop state is released from the past stop state. The past stop state may be defined as a state in which a brake pedal is operated, and for example, a vehicle is traveling at 3.0 km/h or less or a vehicles is in a stop state for 1 seconds. Further, the state in which the stop state is released may be defined as a state in which operation of a brake pedal is released (in a state of brake-off). The own vehicle state determination unit 160 monitors a vehicle speed from detection information of a wheel speed sensor of the vehicle sensor 102 and also monitors from a detection value of an on/off detection means of a stop lamp switch of the vehicle sensor 102 whether a brake is turned off from an on-state. The own vehicle state determination unit 160 determines that the condition (a3) is established when the own vehicle state determination unit 160 detects that brake pedal operation is released after a vehicle travels at 3.0 km/h or less for 1 second.

Whether the condition (a4) is established is determined as below.

<An Oncoming Vehicle is Approaching>

Support information provided from the preprocessor 120 includes a speed of an oncoming vehicle with respect to the own vehicle 2 and a distance to a detection area end (the center of an intersection) of the vehicle. From these information, the object state determination unit 162 calculates a time T1 until the oncoming vehicle reaches the center of an intersection.

An arrival time $T1$=(a distance until an oncoming vehicle arrives at the center of an intersection)/(a vehicle speed of the oncoming vehicle)

The object state determination unit 162 determines that an oncoming vehicle is approaching if the arrival time T1 is equal to or lower than a predetermined threshold. When the support information includes information on a plurality of on-coming vehicles, the object state determination unit 162 calculates the arrival time T1 for each on-coming vehicle and compares with a predetermined threshold. The object state determination unit 162 determines that an on-coming vehicle is approaching if at least one arrival time is equal to or less than the predetermine threshold.

<A Person Exists>

Support information provided from the preprocessor 120 includes information indicating whether a person is at or around a pedestrian crossing on which a vehicle passes by when turning right. Then, the object state determination unit 162 determines that a person exists if the support information includes information indicating that there is a person.

Establishment of the condition (a4) corresponds that an object exists or the object is moving in a direction in which the own vehicle 2 travels to cross the opposite lane at an intersection. In the embodiment, "a direction in which a vehicle travels to cross the opposite lane" is a direction in which the own vehicle 2 turns right at an intersection and is indicated by a direction indicated by the traveling locus 6 illustrated in FIG. 7. The object state determination unit 162 determines that the condition (a4) is established when an on-coming vehicle is approaching, or a person exists. Specifically, establishment of the condition (a4) is determined when the approaching on-coming vehicle is detected, when a person is detected on a pedestrian crossing, or when both of the approaching on-coming vehicle and the person on the pedestrian crossing are detected.

The own vehicle state determination unit 160 determines whether the conditions (a1) to (a3) are established and notifies the alarm controller 164 of a determination result of each condition. Further, the object state determination unit 162 determines whether the condition (a4) is established and notifies the alarm controller 164 of a determination result of the condition. The alarm controller 164 determines that the support start conditions are not established even if at least one of the conditions (a1) to (a4) is not established, and waits for right-turn support.

On the other hand, the alarm controller 164 determines that the support start conditions are established when all of the conditions (a1) to (a4) are established. When the alarm controller 164 determines that the support start conditions are established, the alarm controller 164 generates an alarm output instruction and notifies the alarm output unit 148 of the instruction. The alarm output unit 148 outputs an alarm form the output device 104 on receipt of the alarm output instruction.

Figure 8:
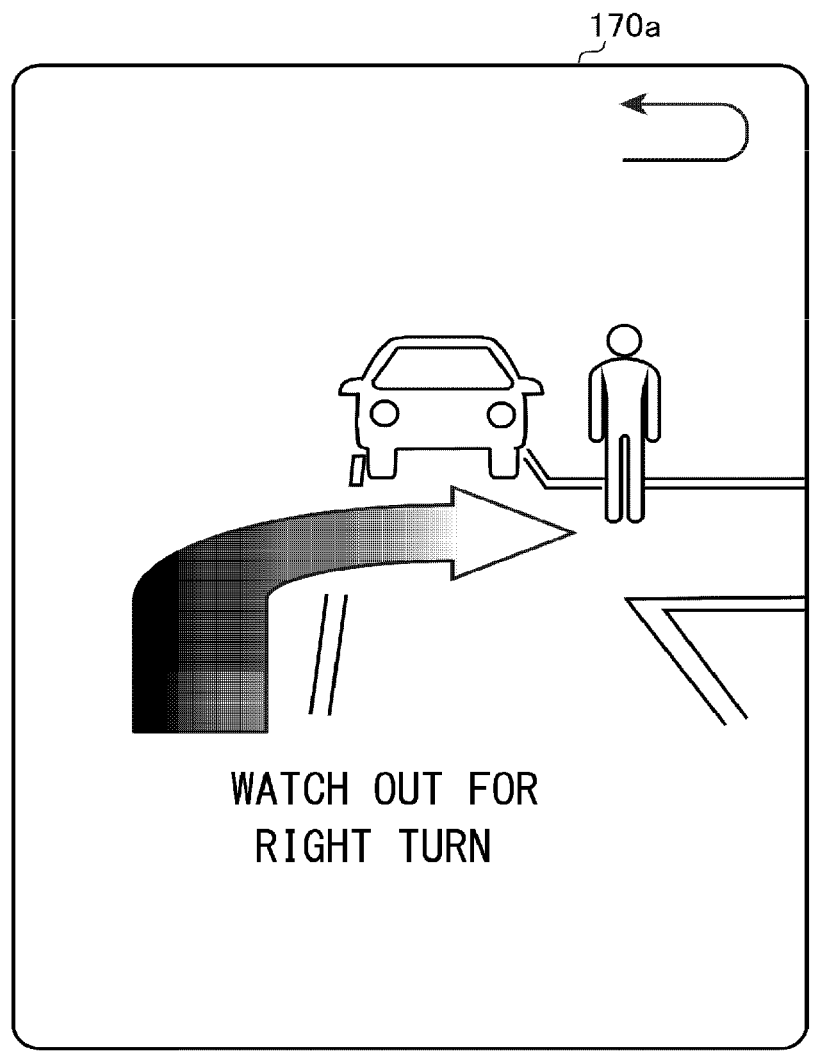
FIG. 8 is a view illustrating an example of an alarm image.

FIG. 8 illustrates an example of the alarm image 170*a* output from the output device 104. The alarm output unit 148 outputs, from the output device 104, the alarm image 170*a* including information indicating that a detection target by the roadside machine 10 is an oncoming vehicle and a person. The alarm image 170*a* includes patterns (symbols) of a vehicle and a pedestrian with letters of "watch out for right turn".

When the vehicle detection sensor 14 detects an oncoming vehicle, when the human detection sensor 16 detects a pedestrian, or when the vehicle detection sensor 14 and the human detection sensor 16 respectively detect an oncoming vehicle and a pedestrian, the alarm output unit 148 output the alarm image 170*a* regardless of a type of the detected object.

When the support information acquisition unit 142 acquires detection information by the vehicle detection sensor 14 and detection information by the human detection sensor 16, and the alarm controller 164 generates an alarm output instruction by a determination result of support start conditions based on the detection information, the alarm output unit 148 outputs, from the output device 104, the alarm image 170*a* including symbols of a vehicle and a pedestrian. In the alarm image 170*a*, the vehicle symbol indicates that the vehicle detection sensor 14 is provided at the intersection, and the pedestrian symbol indicates that the human detection sensor 16 is provided at the intersection. Specifically, the symbols of a vehicle and a pedestrian are included in the alarm image 170*a* to indicate a detection target of the object detection sensor 12 provided at an intersection. When a driver watches the alarm image 170*a*, the driver can detect a risk of collision when turning right and recognize that a detection target of the roadside machine 10 disposed at an intersection where a vehicle turns right is an oncoming vehicle and a pedestrian.

On receipt of an alarm output instruction, the alarm output unit 148 may output an alarm sound from the output device 104 with an alarm image.

When an alarm is output, the support stop determination unit 146 monitors establishment of a condition to stop right-turn support.

The support stop conditions will be described below.

(b1) A driver does not intend to turn right.

(b2) A predetermined time has passed since starting support.

Whether the condition (b1) is established is determined based on detection information by a direction indicator sensor of the vehicle sensor 102. When a driver operates a direction indicator lever to finish flickering a right direction indicator, a direction indicator sensor provides, to the support processor 140, detection information indicating that the right direction indicator is turned off. The support stop determination unit 146 determines that the condition (b1) is established when receiving the detection information that the right direction indicator is turned off.

Whether the condition (b2) is established is determined by whether, for example, 2 seconds has passed since the alarm controller 164 has notified the alarm output unit 148 of an alarm output instruction. The support stop determination unit 146 determines that the condition (b2) is established when the alarm image is displayed for 2 seconds or more.

The support stop determination unit 146 determines that support stop conditions are established if either one of the condition (b1) or (b2) is established. When the support stop determination unit 146 determines that the support stop conditions are established, the support stop determination unit 146 generates an alarm stop instruction and notifies the alarm output unit 148 of the instruction. The alarm output unit 148 finishes alarm output from the output device 104 on receipt of the alarm stop instruction.

The right-turn support processing when both of the vehicle detection sensor 14 and the human detection sensor 16 are provided in the roadside machine 10 has been described above.

The right-turn support processing when the roadside machine does not include the human detection sensor 16 and includes the vehicle detection sensor 14 will be described below.

Figure 9:
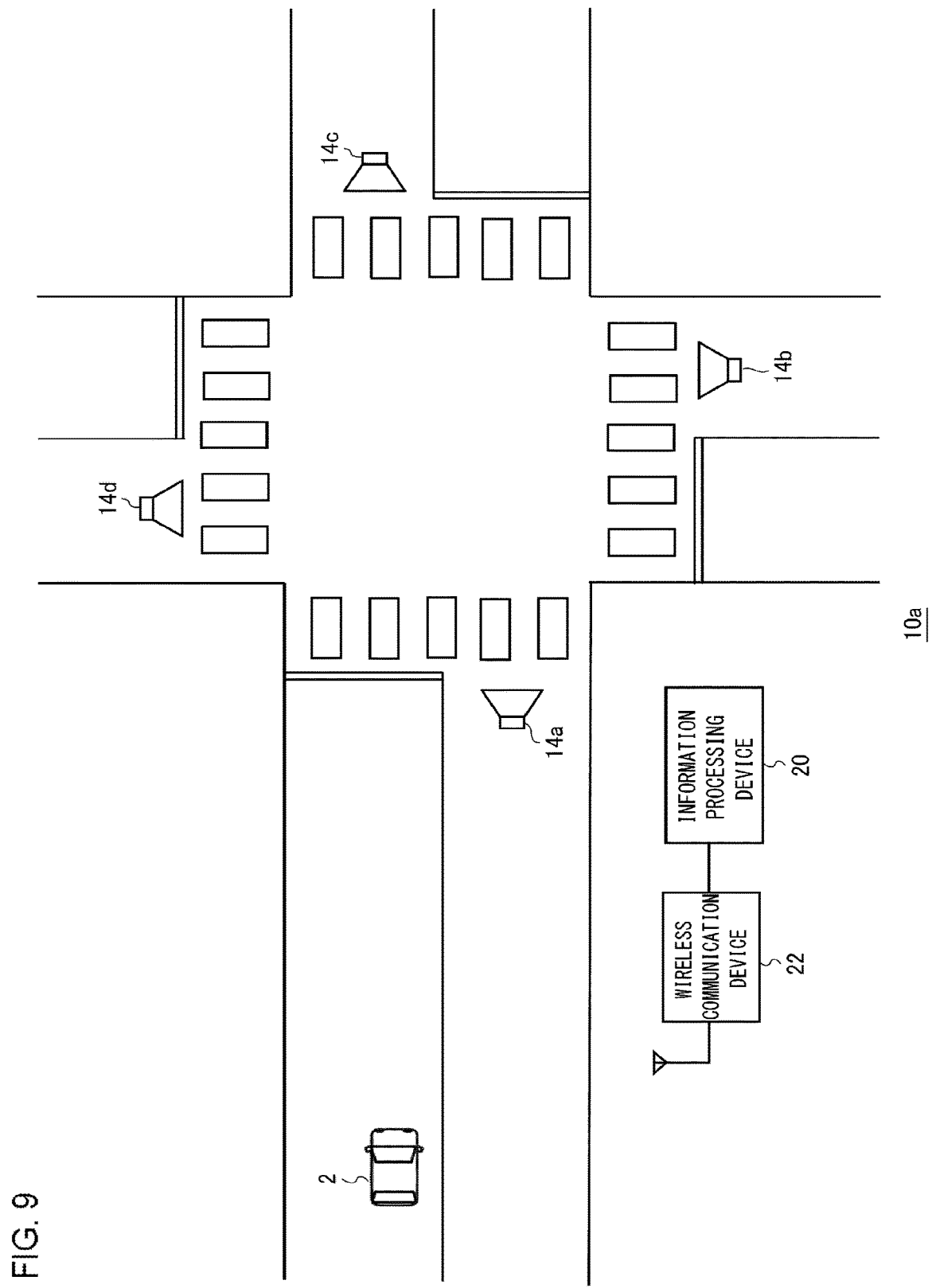
FIG. 9 is a view illustrating an example of a configuration of roadside machines.

FIG. 9 illustrates an example of a configuration of a roadside machine 10*a* at an intersection into which an own vehicle proceeds. The roadside machine 10*a* illustrated in FIG. 9 includes the vehicle detection sensors 14*a* to 14*d* and does not include the human detection sensors 16*a* to 16*d*, and the roadside machine 10*a* differs from the roadside machine 10 illustrated in FIG. 2 in this point.

Therefore, the information processing device 20 obtains detection information by the vehicle detection sensors 14*a* to 14*d* and does not obtain detection information by the human detection sensor. Consequently, intersection information sent from the wireless communication device 22 by broadcasting only includes the detection information by the vehicle detection sensors 14*a* to 14*d* as object detection information.

With reference to FIG. 4, when the intersection information acquisition unit 122 obtains intersection information, the support executability determination unit 130 determines whether driving support processing by the support processor 140 is executable. The support executability determination unit 130 determines executability of the driving support processing according to a type of the detection information included in the intersection information acquired by the intersection information acquisition unit 122. However, the intersection information sent from the roadside machine 10*a* includes detection information by the vehicle detection sensor 14, and therefore the support executability determination unit 130 determines that the driving support processing is executable.

When a vehicle turns right at an intersection, the vehicle crosses the opposite lane and passes through a pedestrian crossing on the right side. A detection target by the roadside machine 10a does not include a pedestrian, but includes an oncoming vehicle. When a vehicle turns right at an intersection where the roadside machine 10a is disposed, the vehicle detection sensor 14 does not detect an oncoming vehicle. Even if an oncoming vehicle is detected, the alarm output unit 148 does not output an alarm when the object state determination unit 162 detects that an oncoming vehicle is not approaching. If an alarm is not output, a driver recognizes that an own vehicle can safely turn right, and the driver operates an accelerator pedal to cross the opposite lane while visually confirming safety.

At this time, the roadside machine 10a is not detecting a pedestrian. Therefore, even if a pedestrian is on a pedestrian crossing ahead of an intersection where the own vehicle 2 turns right, a driver can confirm the pedestrian on the pedestrian crossing while crossing the opposite lane. Therefore, when a pedestrian is found, the driver can immediately operate a brake pedal and stop the own vehicle 2.

As described above, when the roadside machine 10a does not include a human detection sensor and includes the vehicle detection sensor 14, if it is detected that an oncoming vehicle is not approaching, and the alarm output unit 148 does not output an alarm, a driver has time to spare to confirm a pedestrian, and safety is not much affected. Further, when there is an oncoming vehicle to watch out, the alarm output unit 148 suitably outputs an alarm, and a driver can further pay attention to the oncoming vehicle by the alarm. Therefore, when the vehicle detection sensor 14 is included in the roadside machine 10a, regardless of whether a human detection sensor is included, the support executability determination unit 130 determines that driving support processing by the support processor 140 is executable and controls such that the support processor 140 can output an alarm when there is an oncoming vehicle to watch out.

Therefore, when the roadside machine 10a includes only the vehicle detection sensor 14, the information processing device 100 in the in-vehicle device 90 performs driving support processing targeting an oncoming vehicle. The object state determination unit 162 determines whether an oncoming vehicle is approaching based on detection information by the vehicle detection sensor 14.

When all of the above described conditions (a1) to (a4) are established, the alarm controller 164 determines that a support start condition is established, generates an alarm output instruction, and notifies the alarm output unit 148 of the instruction. The alarm output unit 148 outputs an alarm from the output device 104 on receipt of the alarm output instruction.

Figure 10:
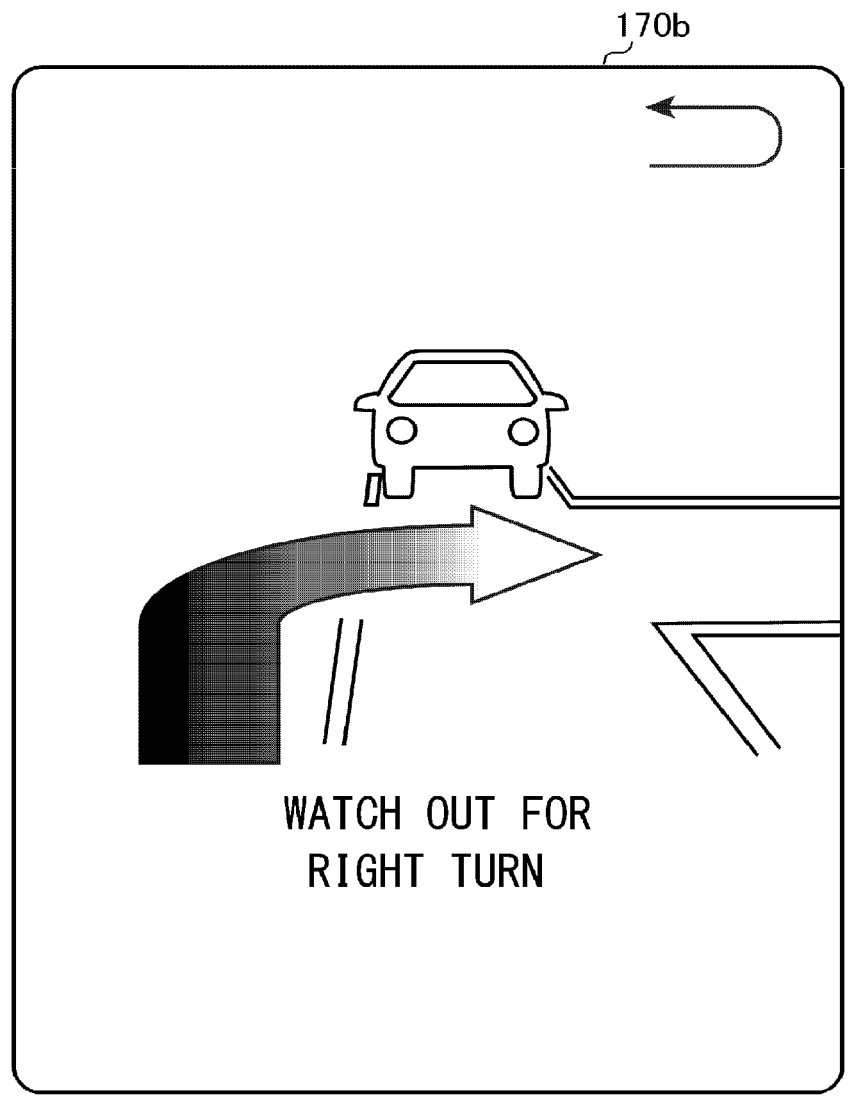
FIG. 10 is a view illustrating an example of an alarm image.

FIG. 10 illustrates an example of an alarm image 170b output from the output device 104. The alarm output unit 148 outputs, from the output device 104, the alarm image 170b including information indicating that a detection target by the roadside machine 10a is an oncoming vehicle. The alarm image 170b includes a pattern (symbol) of a vehicle with letters of "watch out for right turn".

When the support information acquisition unit 142 obtains detection information by the vehicle detection sensor 14, and the alarm controller 164 generates an alarm output instruction by a determination result of a support start condition based on the detection information, the alarm output unit 148 outputs, from the output device 104, the alarm image 170b including a vehicle symbol. In the alarm image 170b, a vehicle symbol indicates that the vehicle detection sensor 14 is provided at an intersection, and the vehicle symbol is information indicating that a detection target by the roadside machine 10a is an oncoming vehicle.

In comparison with the alarm image 170a illustrated in FIG. 8, the alarm image 170b illustrated in FIG. 10 does not include information indicating that a person is a detection target (a pedestrian symbol). Therefore, when a driver watches the alarm image 170b, the driver can know a risk of a collision when turning right and recognize that a detection target by the roadside machine 10a disposed at an intersection where an own vehicle turns right is an oncoming vehicle.

As indicated in the alarm image 170a illustrated in FIG. 8 and the alarm image 170b illustrated in FIG. 10, the alarm image includes information indicating a detection target by a roadside machine disposed at an intersection, and accordingly a driver can know the detection target at the intersection when watching the alarm image. Therefore, the driver can understand a detection target and pay attention to an oncoming vehicle and a pedestrian when turning right at the same intersection. The alarm controller 164 refers to a type of the detection information included in support information when generating an alarm output instruction. If the support information includes detection information by the vehicle detection sensor 14 and the human detection sensor 16, an output instruction of the alarm image 170a is provided to the alarm output unit 148. On the other hand, when the support information only includes detection information by the vehicle detection sensor 14, an output instruction by the alarm image 170b is provided to the alarm output unit 148. In this manner, depending on whether detection information by the human detection sensor 16 is acquired or not, the alarm controller 164 suitably indicates by changing a mode of an output alarm whether a pedestrian is included in a detection target. In this manner, an alarm image according to a detection target at an intersection is output from the output device 104.

The case where the roadside machine does not include the vehicle detection sensor 14 and includes the human detection sensor 16 will be described below.

Figure 11:
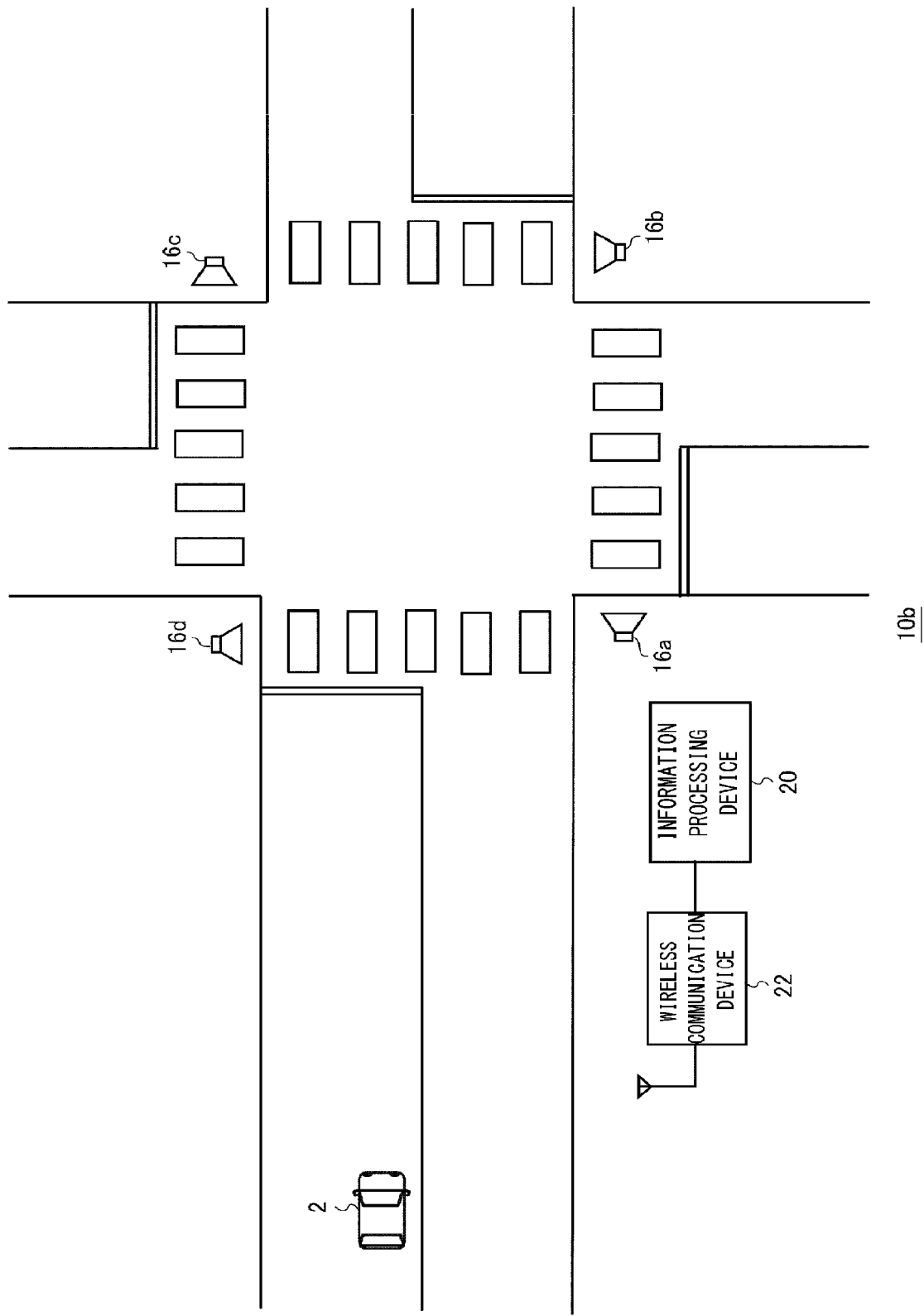
FIG. 11 is a view illustrating an example of a configuration of roadside machines.

FIG. 11 illustrates an example of a configuration of a roadside machine 10b at an intersection into which an own vehicle proceed. The roadside machine 10b illustrated in FIG. 11 includes the human detection sensors 16a to 16d and does not include the vehicle detection sensors 14a to 14d, and the roadside machine 10b differs from the roadside machine 10 illustrated in FIG. 2 in this point.

Therefore, the information processing device 20 acquires detection information by the human detection sensors 16a to 16d and does not obtain detection information by the vehicle detection sensor. Consequently, intersection information sent from the wireless communication device 22 by broadcasting only includes the detection information by the human detection sensors 16a to 16d as object detection information.

With reference to FIG. 4, when the intersection information acquisition unit 122 obtains intersection information, the support executability determination unit 130 determines whether driving support processing by the support processor 140 is executable. The support executability determination unit 130 determines executability of the driving support processing according to a type of detection information included in the intersection information acquired by the intersection information acquisition unit 122. At this time, the support executability determination unit 130 determines that the driving support processing is not executable since the intersection information sent from the roadside machine 10b does not include detection information by the vehicle detection sensor. The determination reason will be described below.

When a vehicle turns right at an intersection, the vehicle crosses the opposite lane and passes through a pedestrian crossing on the right side. A detection target by the roadside machine 10b does not include an oncoming vehicle. In this case, the support processor 140 considers based on detection information from the roadside machine 10b whether an alarm should be output.

For example, if a driver has received an alarm from the in-vehicle device 90 in the past at an intersection where the roadside machine 10b is disposed, the driver recognizes that a right-turn support service is provided at the intersection. An alarm in the right-turn support service is output when a pedestrian on a pedestrian crossing on the right side is detected, and the alarm is not output by detecting an oncoming vehicle. However, a driver may think that an alarm must be output when there is a risk of a collision when a vehicle turns right at the intersection since the driver has an experience that the driver receives the alarm at the intersection. Such a driver is likely to recognize that a vehicle can safely turn right if an alarm is not output when the vehicle waits to turn right at the intersection.

However, the alarm output in the past has been output since a pedestrian has been detected, and the alarm is not related to the presence of an oncoming vehicle. Nevertheless, if a driver believes that a perfect right-turn support service can be received at the intersection, the driver might cross the opposite lane by operating an accelerator pedal without sufficiently confirming safety since an alarm is not output when an own vehicle waits to turn right. In this case, the risk of a collision is increased since detection of an oncoming vehicle is delayed.

This situation occurs because the driver misunderstands that a perfect right-turn support service is performed at the intersection since the driver has received an alarm in the past. Therefore, not to cause such misunderstanding, the inventor of the present invention thinks of that, when the roadside machine 10b does not include a vehicle detection sensor, driving support processing is not performed originally based on detection information by the roadside machine 10b when a vehicle turns right, and alarm output should be inhibited. Specifically, an experience that a driver receives an alarm at the intersection is not given to the driver at all to cause the driver to recognize that a right-turn support service is not performed at the intersection. Accordingly, the driver more consciously sufficiently confirm safety without relying on an alarm. Therefore, the support executability determination unit 130 according to the embodiment inhibits driving support processing by the support processor 140 when the roadside machine 10b does not include a vehicle detection sensor.

If the support executability determination unit 130 determines that the driving support processing is not executable, the support executability determination unit 130 controls such that each function of the support processor 140 is not started.

In this manner, the support processor 140 does not perform driving support processing. The support processor 140 does not need to output an alarm. Therefore, a function of the alarm output unit 148 is stopped, and only alarm output may be inhibited. Each of the road information generator 124, the traveling position specification unit 126, and the support information generator 128 in the preprocessor 120 performs pre-processing necessary for driving support processing in the support processor 140. However, if the driving support processing is not performed in the support processor 140, each processing in the road information generator 124, the traveling position specification unit 126, and the support information generator 128 is not needed. Therefore, when the support executability determination unit 130 determines that the driving support processing is not executable, the support executability determination unit 130 may control such that each function of the road information generator 124, the traveling position specification unit 126, and the support information generator 128 are not started.

When a vehicle detection sensor is installed in the roadside machine 10b in the future, intersection information will include detection information by the vehicle detection sensor. At that time, human detection information can be effectively used.

Figure 12:
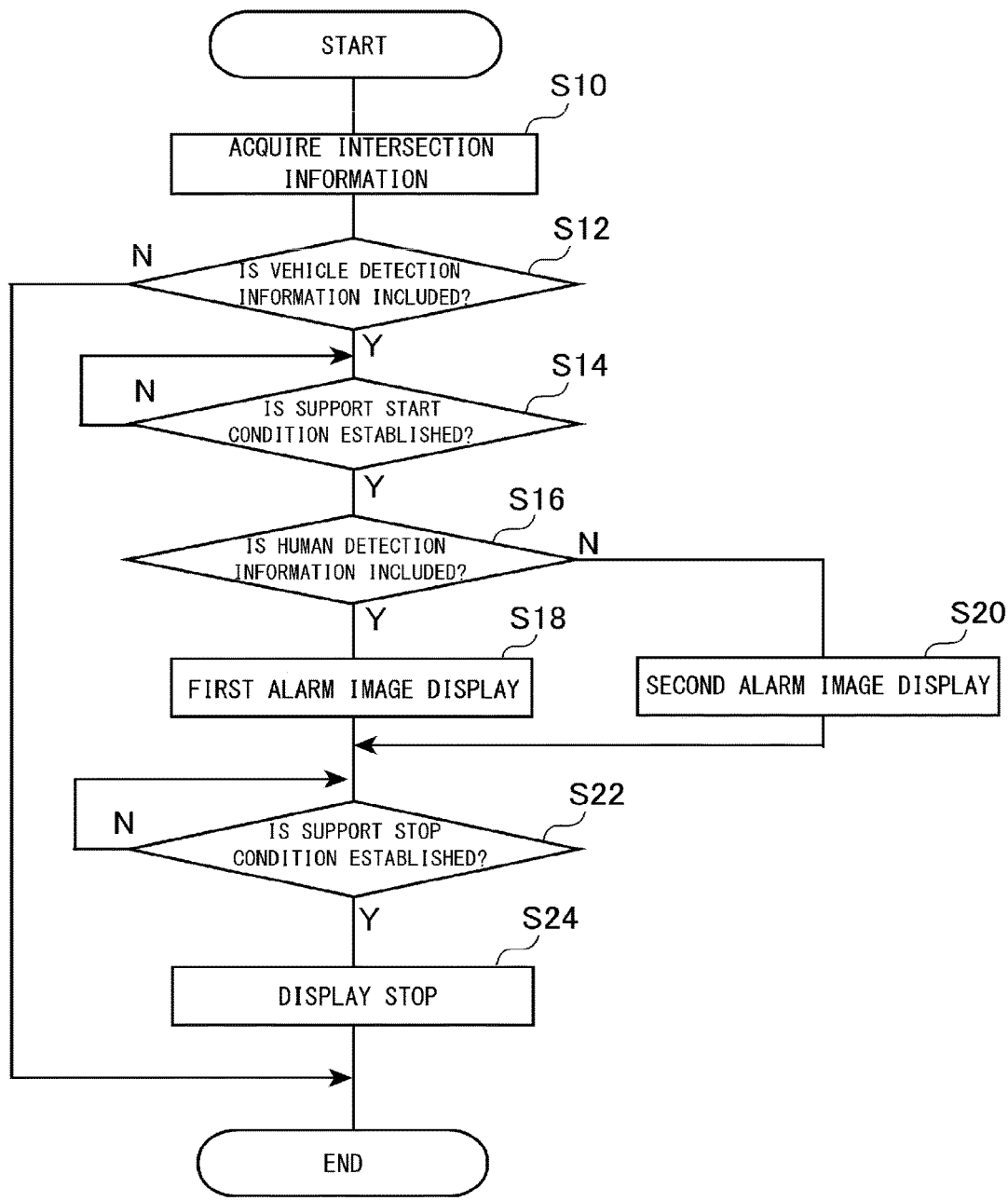
FIG. 12 is a flowchart illustrating support execution determination and support processing.

FIG. 12 is a flowchart illustrating support execution determination and support processing by the information processing device 100. The intersection information acquisition unit 122 acquires intersection information sent from a roadside machine in the in-vehicle device 90 (S10). When the intersection information acquisition unit 122 acquires intersection information, the support executability determination unit 130 determines executability of driving support processing by the support processor 140 according to a type of object detection information included in the intersection information (S12). More specifically, the support executability determination unit 130 determines that driving support processing is executable if the object detection information includes vehicle detection information (Y in S12). On the other hand, the support executability determination unit 130 determines that the driving support processing is not executable if the object detection information does not include vehicle detection information (N in S12), and the support processor 140 does not perform the driving support processing.

When the driving support processing is determined to be executable, the support start determination unit 144 monitors establishment of conditions to start alarm output (N in S14). When the support start conditions are established (Y in S14), the support start determination unit 144 refers to the type of object detection information (S16). If the object detection information includes vehicle detection information and human detection information (Y in S16), the support start determination unit 144 notifies the alarm output unit 148 of an output instruction on the alarm image 170a (refer to FIG. 8), and the alarm output unit 148 outputs the alarm image 170a from the output device 104 (S18). On the other hand, if object detection information only includes vehicle detection information (N in S16), the support start determination unit 144 notifies the alarm output unit 148 of an output instruction on the alarm image 170b (refer to FIG. 10), and the alarm output unit 148 outputs the alarm image 170b from the output device 104 (S20).

After the alarm image is output, the support stop determination unit 146 monitors establishment of conditions to stop alarm output (N in S22). When the support stop conditions are established (Y in S22), the support stop determination unit 146 notifies the alarm output unit 154 of an instruction to stop an alarm. The alarm output unit 154 stops alarm display from the output device 104 on receipt of an instruction to stop an alarm (S24).

The present invention has been described above according to the embodiment. The embodiment is described as an example. A person skilled in the art understands that the embodiment can be varied by combination of each component and each processing, and such variation is within the scope of the present invention.

What is claimed is:

1. A driving support device, comprising:
an acquirer configured to acquire detection information sent from a roadside machine disposed at or around an intersection of a road, the detection information being detected by an object detection sensor including at least one of a vehicle detection sensor and a human detection sensor; and
a support processor configured to perform driving support processing for outputting an alarm when the support processor (i) determines that an own vehicle, driven by a person, intends to cross an opposite lane at the intersection of the road and (ii) determines based on the acquired detection information that an object exists or the object is approaching in a direction in which the own vehicle travels to cross the opposite lane at the intersection of the road, wherein both:
(iii) the support processor performs the driving support processing when the acquirer acquires detection information by the vehicle detection sensor for detecting a vehicle traveling on the opposite lane and approaching the intersection of the road, and
(iv) the support processor does not perform the driving support processing when the acquirer acquires detection information by the human detection sensor for detecting a person existing ahead of the opposite lane in a direction in which the own vehicle travels to cross the opposite lane and does not acquire detection information by the vehicle detection sensor.

2. The driving support device according to claim 1, wherein
the support processor changes a mode of the output alarm depending on whether the acquirer acquires the detection information by the human detection sensor or not.

3. The driving support device according to claim 1, further comprising a support executability determiner configured to determine executability of the driving support processing by the support processor according to a type of the detection information acquired by the acquirer.

* * * * *